United States Patent
Juengling et al.

[11] Patent Number: 5,667,833
[45] Date of Patent: Sep. 16, 1997

[54] MANUFACTURE OF PASTA

[75] Inventors: Daniele Juengling, Vevey, Switzerland; Thomas Wilhelm Hauser, Eboli, Italy; Jürg Lechthaler, Wallisellen, Switzerland; Luca Rusconi; Armando Dos Santos Pousa, both of Winterthur, Switzerland; Philipp Paul Meyer, Benglen, Switzerland

[73] Assignee: Nestec S.A., Vevey, Switzerland

[21] Appl. No.: 430,550

[22] Filed: Apr. 28, 1995

[30] Foreign Application Priority Data

Apr. 28, 1994 [CH] Switzerland ............... 1324/94

[51] Int. Cl.$^6$ ........................................ A21D 6/00
[52] U.S. Cl. ................. 426/496; 426/504; 426/516; 426/557
[58] Field of Search .................. 426/496, 504, 426/516, 519, 557, 451

[56] References Cited

U.S. PATENT DOCUMENTS

| | | | |
|---|---|---|---|
| 4,383,813 | 5/1983 | Podell et al. | 425/204 |
| 4,474,473 | 10/1984 | Higuchi et al. | 425/208 |
| 4,938,127 | 7/1990 | van Lengerich | 99/353 |
| 4,943,402 | 7/1990 | Kafka et al. | 425/209 |
| 5,126,159 | 6/1992 | Manser et al. | 426/549 |
| 5,139,806 | 8/1992 | Hauser et al. | 426/496 |
| 5,186,539 | 2/1993 | Manser et al. | 366/85 |

FOREIGN PATENT DOCUMENTS

| | | |
|---|---|---|
| 823724 | 4/1975 | Belgium . |
| 872505 | 3/1979 | Belgium . |
| 0 398 315 | 5/1990 | European Pat. Off. . |
| 0 404 388 | 6/1990 | European Pat. Off. . |
| 0 471 103 A1 | 8/1990 | European Pat. Off. . |
| 0 545 056 A1 | 10/1992 | European Pat. Off. . |
| 0 599 535 A1 | 11/1993 | European Pat. Off. . |
| 2 285 987 | 9/1975 | France . |
| 2 509 963 | 7/1982 | France . |
| 62-58978 | 3/1987 | Japan . |
| WO 90/05452 | 11/1989 | WIPO . |

OTHER PUBLICATIONS

Patent Abstracts of Japan, vol. 014, No. 270 (c–727), 12 Jun. 1990.

Patent Abstracts of Japan, vol. 017, No. 364 (C–1081) 9 Jul. 1993.

Database WPI Week 8716, Derwent Publications Ltd., London GB.

*Primary Examiner*—George Yeung
*Attorney, Agent, or Firm*—Pennie & Edmonds LLP

[57] ABSTRACT

Process and equipment for manufacturing process pasta, in which a mixture of cereal flour or semolina and water having a water content of 25–40% is prepared, the mixture is kneaded and it is extruded by pressing it through an extrusion die with the aid of a gear pump.

13 Claims, 5 Drawing Sheets

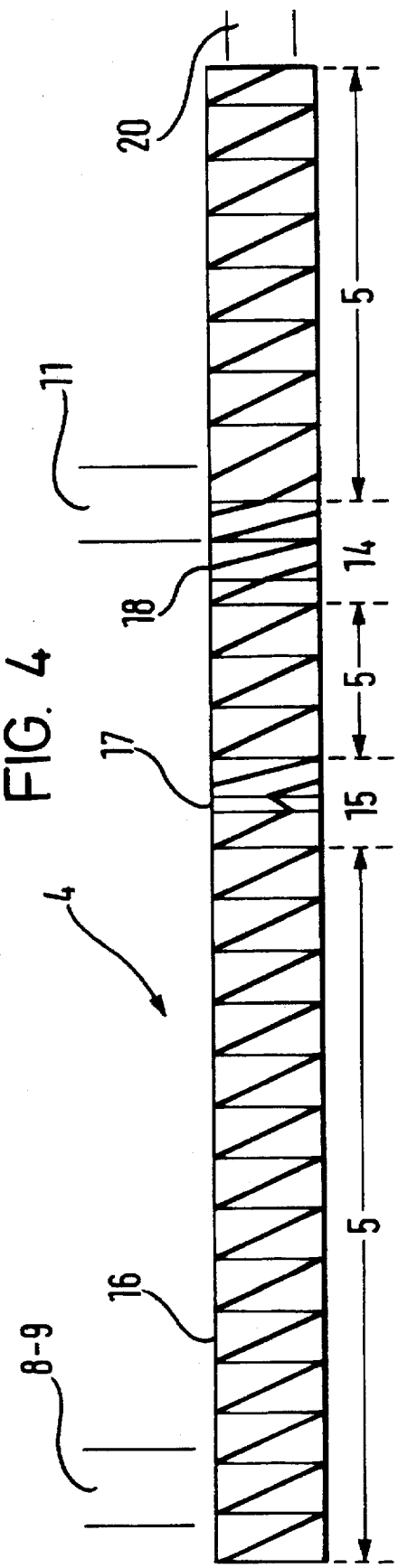
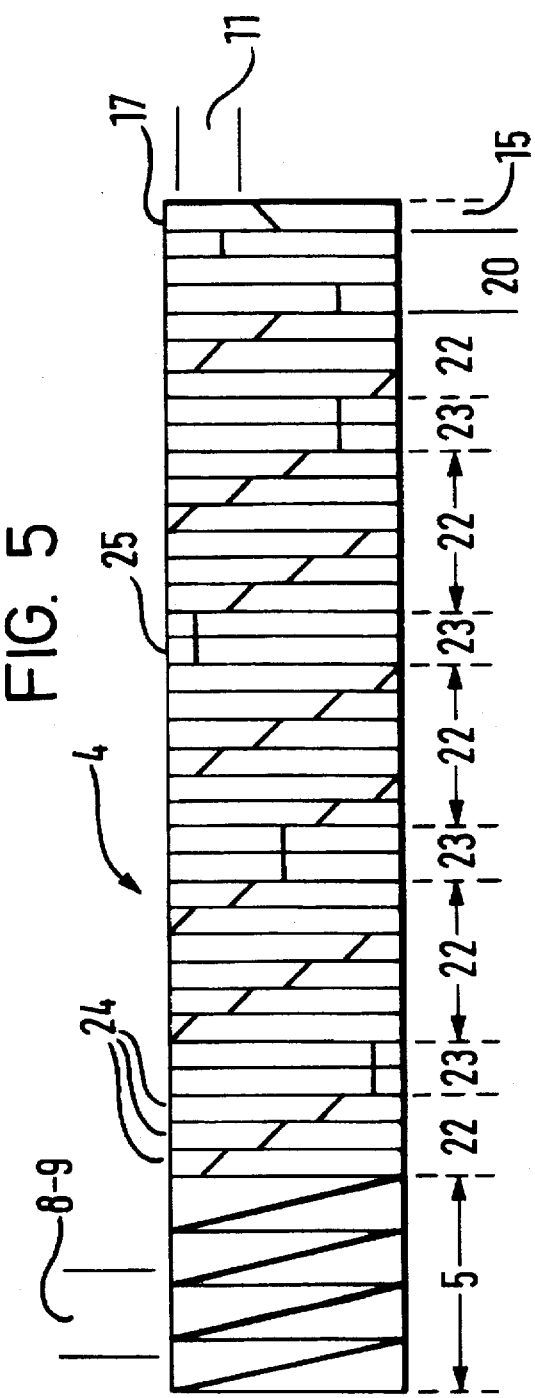

MANUFACTURE OF PASTA

TECHNICAL FIELD

The subject of the present invention is a process for the manufacture of pasta in which a mixture of cereal flour or semolina and water having a water content of 25–40% is prepared, the mixture is kneaded and it is extruded, as well as equipment for the implementation of this process.

BACKGROUND ART

U.S. Pat. No. 5,126,159 (BUEHLER AG) describes a process for the manufacture of pasta where the three operations of mixing, kneading and extrusion are performed continuously in three separate devices, connected in series, belonging to the same plant. Measured quantities of the semolina and the water are provided directly therein, in a rapid paddle mixer which delivers a mixture in the form of lumps of moistened semolina. These lumps are introduced into a kneading device consisting of two screws rotating in the same direction and meshing with each other, where they are processed into a dough of dry and brittle appearance. This dough is introduced into a single-screw extruder where it is pressed through a die under the pressure exerted by the screw, in the form of pasta of section defined by the shape of the die openings.

U.S. Pat. No. 5,186,539 (BUEHLER AG) describes a process for the manufacture of pasta where the two operations of mixing and kneading are carried out in the same device, consisting of two screws rotating in the same direction and meshing with each other, and where the extrusion operation is carried out in a separate device, namely a single-screw extruder fed by the first device.

U.S. Pat. No. 5,139,806 (NESTEC S.A.) describes a process for the manufacture of pasta where the three operations of mixing, kneading and extrusion are carried out continuously in a single device with two screws rotating in the same direction and meshing with each other, the pressure required for pressing the dough through the die being exerted by the device with two screws itself.

Each of the three processes described above represents a significant step towards the simplification and the carrying out, in an increasingly shorter time, of the manufacture of pasta. However, the last of these processes, apparently the simplest and most rapid, subjects the said device with two screws to very high stresses since it has to withstand alone all the strain and develop alone all the energy required for the mixing, kneading and extrusion operations, without counting the fact that it subjects the dough to high shearing.

The aim of the present invention is to propose a process for the manufacture of pasta and equipment for its implementation which are simple, consume relatively little energy and subject the said mixture of cereal flour or semolina and water to only a relatively low shearing.

SUMMARY OF THE INVENTION

The present invention relates to a process for the manufacture of pasta, in which a mixture of cereal flour or semolina and water having a water content of about 25–40% is prepared, the mixture is kneaded and it is extruded, distinguishes itself by the fact that the mixture is extruded by pressing it through an extrusion die with the aid of a gear pump. In this process, the mixing and/or kneading operations are preferably carried out in a device with two screws rotating in the same direction and meshing with each other.

Likewise, the equipment for the implementation of the process according to the present invention comprises a mixing and/or kneading device, a gear pump and an extrusion die. Preferably, the mixing and/or kneading device comprises two screws rotating in the same direction and meshing with each other.

It has indeed been observed, surprisingly, that it is possible thus to manufacture pasta having organoleptic qualities at least comparable to those of pasta manufactured by a traditional process, in spite of the fact that this dough obtained by the mixing and/or kneading operations subsequently passes through a gear pump and that this dough is briefly subjected therein to severe stresses which it could be feared would damage its texture, especially by destroying or by weakening the gluten network established during the kneading operation.

Indeed, between the teeth of a gear pump comprising two toothed wheels or rollers which mesh with each other, the dough may be subjected to a compression of several hundreds of bar during a fraction of a second, for example.

The fact that the texture of the mixture subjected to such stresses, or more precisely to such a compression, is not damaged, but that it is on the contrary possible for a gluten network to be perfectly maintained, or even developed by this passage through a gear pump, appears indeed to represent one of the most surprising features of the present invention.

It was also observed that pasta can thus be manufactured during practically an equally short time, especially in less than one minute, but using considerably less energy than using the process according to U.S. Pat. No. 5,139,806, for example.

It was finally observed that it is even possible thus to manufacture pasta having a longer cooking time with a uncooked material of the same quality or pasta having an identical cooking time with a uncooked material of lower quality.

DETAILED DESCRIPTION OF THE PREFERRED EMBODIMENTS

To carry out the present process, it is possible to use a cereal flour or semolina, especially a hard wheat semolina having a particle size range of 250–350 µm or a soft wheat flour having a particle size range of 50–150 µm, supplemented or otherwise with ingredients such as egg yolk, sodium chloride and/or spices, for example.

When a flour with a fine particle size range, especially of 50–150 µm, is used, a premixing step can be optionally envisaged, especially in a rapid paddle mixer which delivers a premix in the form of lumps of moistened flour.

This cereal flour or semolina is mixed with a quantity of water such that the mixture obtained has a water content of about 25–40%, preferably 30–35% by weight.

In order to produce uncooked and non-precooked pasta, care may be taken to ensure that the temperature of the mixture during the operations remains below the starch gelatinization temperature of the cereal used. It is also possible to avoid damaging the gluten by not allowing the temperature of the mixture to rise to excessively high values. Accordingly, the temperature of the mixture is preferably maintained at a value of less than 55° C., or even of less than 50° C., during all the operations.

Similarly, the mixing and/or kneading operations can optionally be carried out in a single-screw device such as the sole screw of a single-screw extruder, but they are preferably carried out in a device with two screws rotating in the same direction and meshing with each other under conditions such that the said mixture of cereal flour or semolina and water is only subjected to a relatively low shearing.

The two screws may be the screws of an extruder or of a twin-screw mixer, for example, of which the general drawing or the arrangement and/or the layout of the various components which constitute them, especially mixing and/or kneading blades or bilobes, are such that the mixing and/or kneading operations can be carried out while subjecting the mixture of cereal flour or semolina and water to only a relatively low shearing.

The said mixing and/or kneading operations can be carried out in a residence time of 20–60 seconds in the extruder or the said mixer, at a relatively low pressure, especially of less than or equal to 30 bar, or even of less than 20 bar, and preferably of between 1 and 12 bar, while the two screws are being rotated at a speed of between 20 and 120 revolutions per minute (rpm), for example.

The pressure exerted by the pump on the mixture in order to press it through the die may be 50–120 bar, preferably 80–120 bar, for example.

It may be useful, or even necessary to provide for a degassing of the mixture upstream of the pump, especially by aspiration by a vacuum of less than 0.5 bar, preferably of less than or equal to 0.2 bar, for example. Such a degassing is necessary in the case of manufacture of dried pasta, as opposed to the case of manufacture of fresh pasta, because it makes it possible to avoid cracking problems with the pasta during drying. It makes it possible, in particular, to avoid the formation of cracks and/or the appearance of white spots, otherwise unavoidable, at the surface of the pasta, for example.

This degassing operation is preferably carried out with the aid of a vacuum aspiration aperture under conditions such that a preferential path for air circulation cannot become established through the mixture between the said vacuum aspiration aperture and an inlet or inlets provided for feeding the screws with cereal flour or semolina and/or with water.

The extruded pasta according to the present invention can then be dried in a traditional manner known to persons skilled in the art. They can also be prepared as they are, like fresh pasta, for example.

The equipment according to the present invention therefore comprises a mixing and/or kneading device, a gear pump and an extrusion die. It may also optionally comprise a premixing device, comprising especially a rapid paddle mixer, when it is intended for the manufacture of pasta from flour of fine particle size range.

The mixing and/or kneading device may also optionally comprise a single screw such as the sole screw of a single-screw extruder, but it preferably is a mixer or extruder having twin screws rotating in the same direction and meshing with each other, for example.

The two screws may have, alternately and/or successively, mixing, compressing, kneading and/or holding zones, for example. These zones can be appropriately formed by varying the length and the direction of the screw pitch, or even the shape of the screws in these zones.

The two screws may comprise in particular two parallel shafts rotating in the same direction, upon which bilobes each having the shape of a screw section whose thickness may be less than, equal to or greater than the screw pitch are fitted and attached onto each other. The length and the direction of the screw pitch associated with a bilobe, just like the respective angular positions of two successive bilobes can be chosen as a function of the type of work or operation which it is desired to perform in the zone considered.

To form a mixing zone, bilobes with a relatively long positive pitch can be used. To form a compressing zone, bilobes with a relatively short positive pitch can be used. To form a kneading zone, bilobes with no pitch can be used. To form a mixed zone for mixing and kneading, successive bilobes with a relatively long positive pitch can be used which are angularly spaced apart. Finally, to form a holding zone, bilobes with a negative pitch can be used.

The shape of the bilobes of a twin-screw mixer seen in the direction of the axle of the screws can be distinguished from the corresponding shape of the bilobes of a twin-screw extruder by a smaller width, which leaves more free space for the material to be treated, namely for the said mixture of cereal flour or semolina and water. This smaller width of the bilobes can be combined with a smaller diameter of the said axles as well as with a smaller screw length/diameter ratio, especially a ratio of between 7 and 10 for a twin-screw mixer compared with a ratio of between 20 and 30 for a twin-screw extruder, for example.

The twin-screws may be enclosed in a sleeve, preferably a jacketed sleeve, especially a jacketed sleeve subdivided into compartments in which a cooling or heating fluid can be circulated. This sleeve may have at an upstream end one or more inlets for feeding cereal flour or semolina and/or water into the screws, and at a downstream end, an outlet for the mixture.

The gear pump may comprise two toothed wheels, or toothed rollers which mesh with each other. The two rollers can rotate in a housing on axles situated in a plane perpendicular to the direction of a dough stream to be extruded coming from the mixing and/or kneading device. They can each rotate in the opposite direction, the teeth coming apart upstream and closing again downstream. The outer edge of the teeth can slide against a corresponding inner wall of the housing, thus defining interstitial spaces intended for transporting the dough to be extruded downstream.

The shape of the teeth may be specially designed to avoid as much as possible any friction between the teeth which mesh with each other and any shearing on the dough transported.

Independent traction means, especially separate motors, are preferably provided for the said two screws and for the pump. Such a preferred embodiment of the present equipment allows a particularly flexible implementation of the present process because it makes it possible to independently adjust the speed of rotation of the extruder or mixer screws and that of the pump rollers, and it makes it possible to control independently various essential parameters such as the kneading time and temperature and the extrusion pressure, for example.

A vacuum aspiration aperture may be provided upstream of the gear pump. The said aspiration aperture may be connected to a final mixing zone of the said two screws, between a holding, compressing or kneading zone and a downstream end of the screws, at the downstream end or between the downstream end of the screws and the gear pump, for example. It is in fact important that at least one holding, compressing or kneading zone is provided between the vacuum aspiration aperture and the said inlet or inlets for feeding flour and/or water into the screws, so as to be able to ensure good filling of the screws, in other words good compacting of the mixture before subjecting it to degassing.

A device for expelling the mixture, especially an expelling twin-screw intended to expel into the mixing and/or kneading device the mixture particles which might have been aspirated in spite of the compacting, can also be provided in the vacuum aspiration aperture.

The extrusion die may comprise one or more extrusion conduits, especially cylindrical conduits, generally oriented in the same direction as that of a stream of dough to be extruded coming from the gear pump, preferably in a direction perpendicular to the plane in which the roller axles are situated, for example. The shape of the extruded pasta may be determined in particular by the shape of the outlet opening or orifice of the said conduits.

The gear pump and the die may be enclosed in a jacketed casing subdivided into compartments in which a cooling or heating fluid can be circulated.

BRIEF DESCRIPTION OF THE DRAWINGS

The equipment according to the present invention is described in greater detail below with reference to the accompanying drawings given by way of example and in which:

FIG. 4 is a schematic top view of a screw of the equipment represented in FIG. 2, FIG. 5 is a schematic top view of a screw of the equipment represented in FIG. 3.

Figure 1:
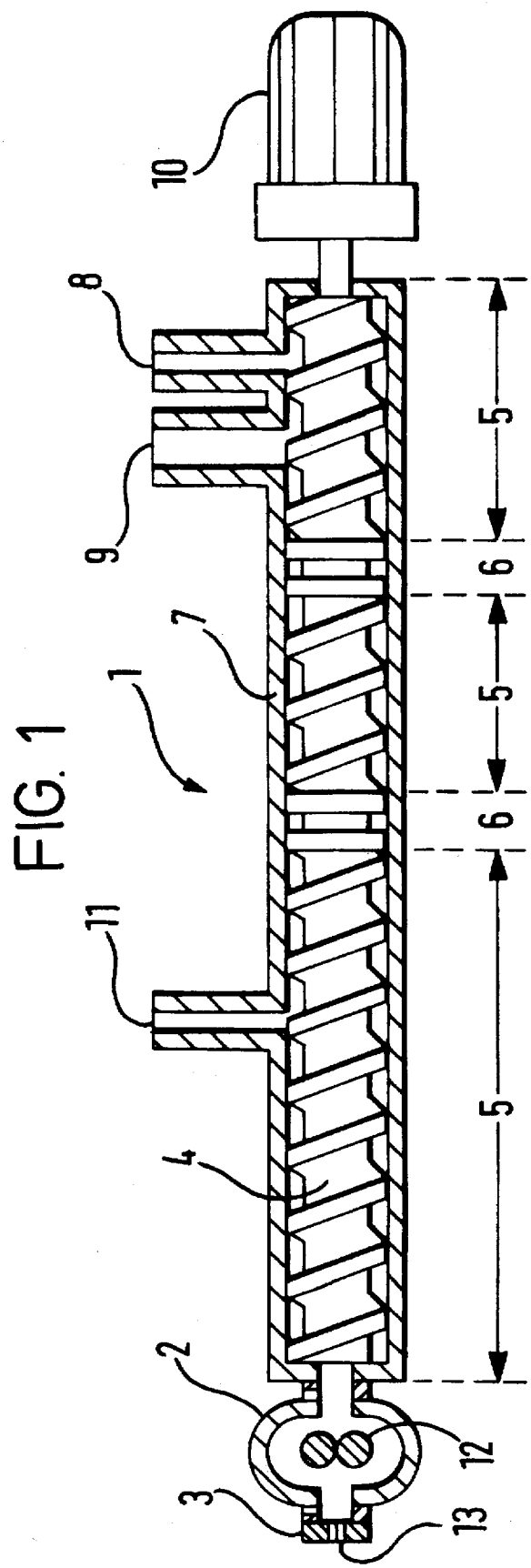
FIG. 1 is a schematic longitudinal sectional side view of a first embodiment of the present equipment.

In the first embodiment represented in FIG. 1, the present equipment comprises a mixing and/or kneading device 1, a gear pump 2 and a die 3 connected in series in a straight line.

The mixing and/or kneading device 1 comprises two screws 4 rotating in the same direction and meshing with each other, namely the screws of a twin-screw extruder. The screws have, alternately, three mixing zones 5 and two kneading zones 6. The screws are enclosed in a sleeve 7 having at its upstream end an inlet 8 for feeding cereal flour or semolina and an inlet 9 for feeding water.

The two screws 4 are driven by a motor 10 different from a motor, not represented, which is provided to drive the gear pump 2.

A vacuum aspiration aperture 11 passes through the sleeve 7 upstream of the gear pump 2. This aperture is connected to the third and final mixing zone 5, between the second kneading zone 6 and the downstream end of the screws 4.

The die 3 comprises a plate parallel to the plane in which the axles of the rollers 12 of the gear pump 2 are situated. The said plate is pierced with several cylindrical extrusion conduits 13 oriented perpendicularly to the said plane.

Figure 2:
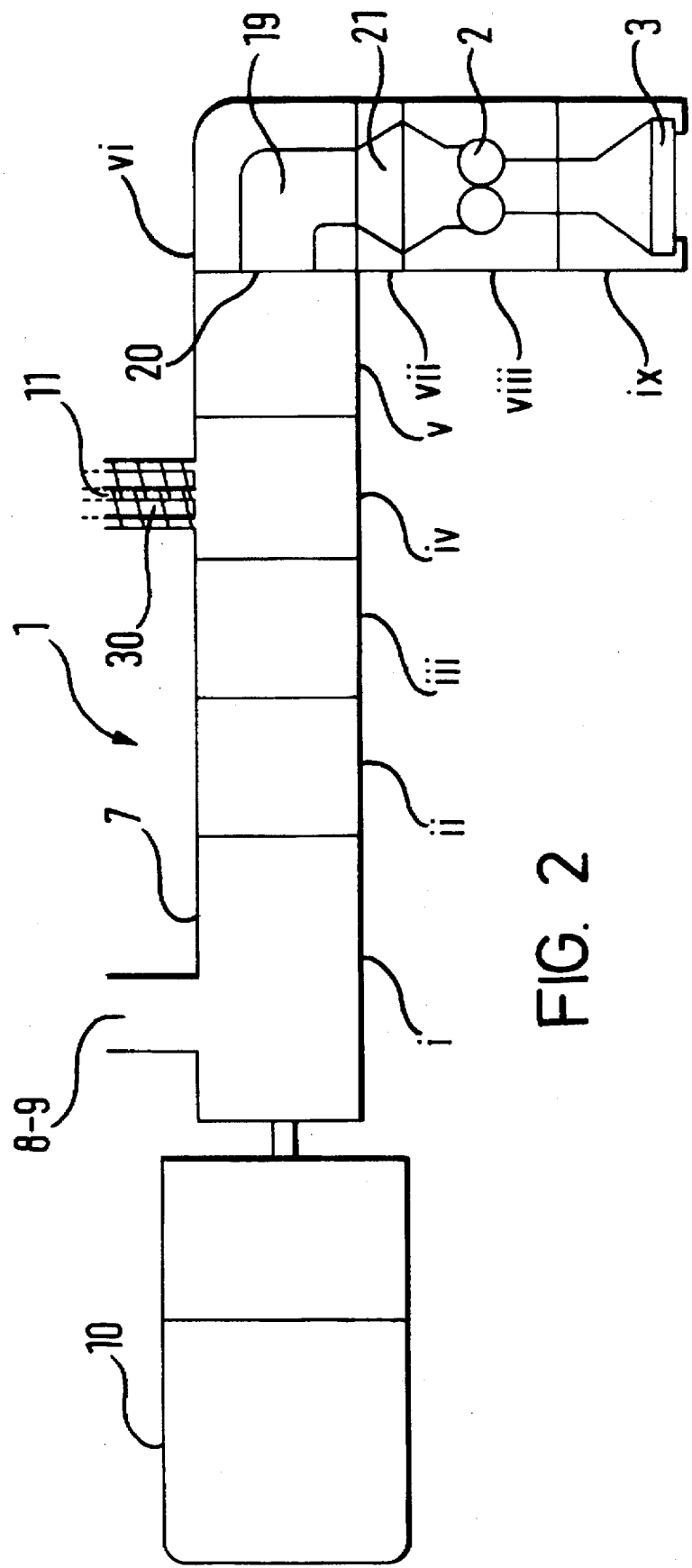
FIG. 2 is a schematic partially open side view of a second embodiment of the present equipment.

In the second embodiment represented in FIG. 2, the present equipment comprises a mixing and/or kneading device 1, a gear pump 2 and a die 3 connected in series in a line curved downwards at the level of the connection between the device and the pump.

The mixing and/or kneading device 1 comprises two screws turning in the same direction and meshing with each other, namely the screws of a twin-screw extruder enclosed in a jacketed sleeve 7, which jacket is subdivided into five compartments i–v in which a cooling or heating fluid can be circulated. The sleeve 7 has, at its upstream end, an inlet 8–9 for feeding cereal flour or semolina and for feeding water. A vacuum aspiration aperture 11 passes through the sleeve 7 upstream of the gear pump 2.

As indicated in FIG. 4, this aperture 11 is connected in a position overlapping a compressing zone 14 and a final mixing zone 5 of the said two screws 4 of which only one is represented. These two screws have three mixing zones 5 consisting of bilobes with a long positive screw pitch 16. A holding zone 15 comprising a bilobe with a negative pitch 17 is intercalated between the first two mixing zones.

The said compressing zone 14 comprises bilobes with a short positive pitch 18. It is intercalated between the second and third and final mixing zone. It is intended, just like the holding zone 15, to ensure good filling of the screws, in other words good compacting of the mixture, so as to avoid mixture particles also being aspirated by the vacuum.

An expelling device is provided in the form of an expelling twin-screw 30 in the vacuum aspiration aperture 11. It is intended to expel into the mixing and/or kneading device 1 the mixture particles which may have been aspirated in spite of the compacting.

The two screws 4 are driven by a motor 10 different from a motor, not represented, which is provided to drive the gear pump 2. The latter is connected upstream to the front outlet 20 of the mixing and/or kneading device 1 via a conduit 19 curved at 90° and a vertical connector 21. The axles of the two toothed rollers of the pump are situated in a horizontal plane.

The die 3 comprises a horizontal plate pierced with extrusion conduits oriented in a generally vertical direction.

The part of the equipment comprising the curved conduit 19, the connector 21, the pump 2 and the die 3 is enclosed in a jacketed casing subdivided into four compartments vi–ix in which a cooling or heating fluid can be circulated.

Figure 3:
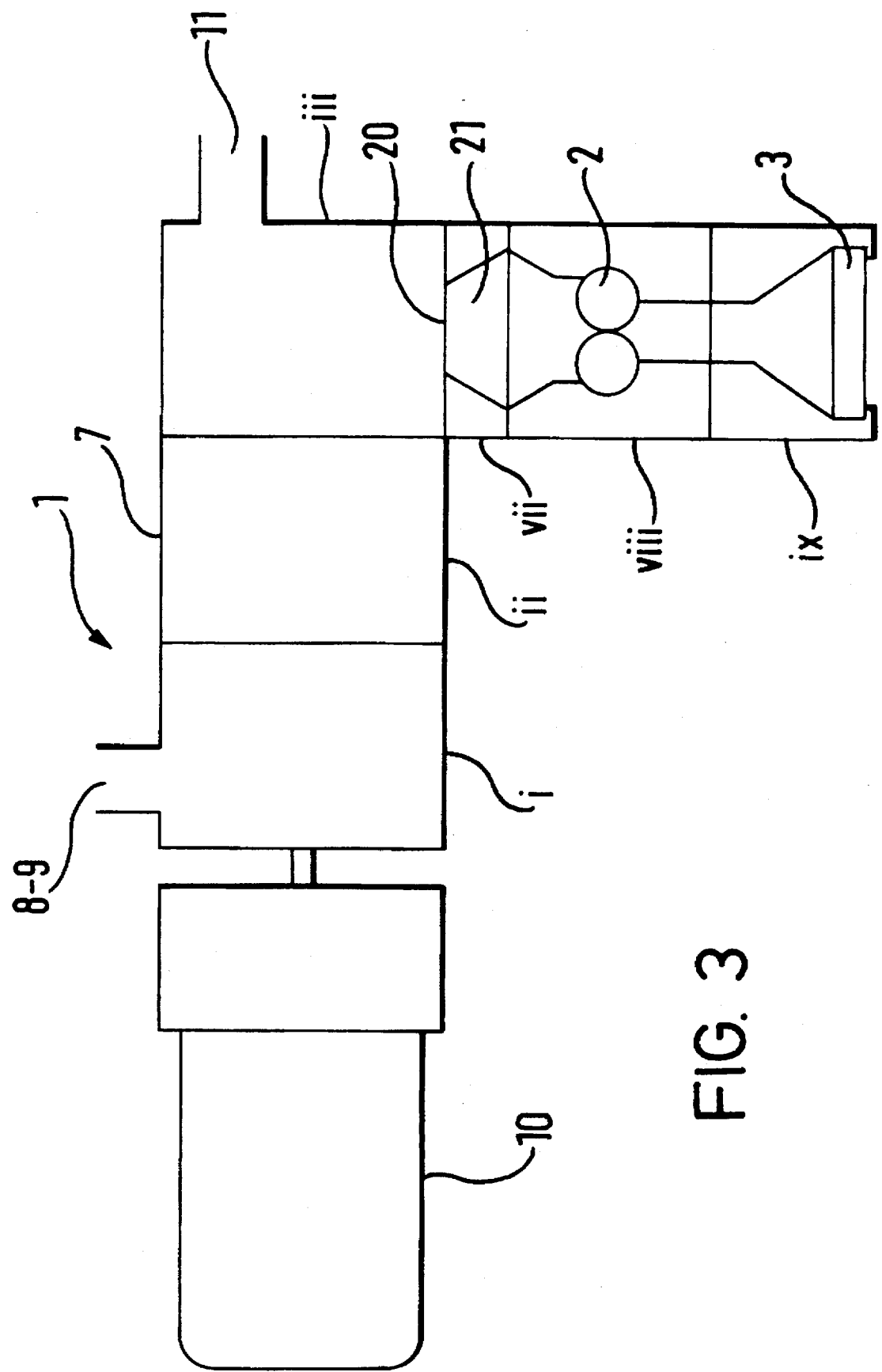
FIG. 3 is a schematic partially open side view of a third embodiment of the present equipment.

In the third embodiment represented in FIG. 3, the present apparatus comprises a mixing and/or kneading device 1, a gear pump 2 and a die 3 connected in series in a line broken downwards at right angles at the level of the connection between the said device and the pump.

The mixing and/or kneading device 1 comprises two screws turning in the same direction and meshing with each other, namely the screws of a twin-screw mixer enclosed in a jacketed sleeve 7, which jacket is subdivided into three compartments i–iii in which a cooling or heating fluid can be circulated. The sleeve 7 has, at its upstream end, an inlet 8–9 for feeding cereal flour or semolina and for feeding water. The sleeve 7 has, on the underside of its downstream end, an outlet 20 intended to allow a vertical stream of dough to be extruded to escape downwards in the direction of the gear pump 2.

As indicated in FIG. 5, the said two screws 4, of which only one is represented, have, at their upstream end, a mixing zone 5. They then have alternately five mixed zones for mixing and kneading each consisting of a few bilobes 24 with a relatively long positive pitch angularly spaced apart relative to each other, on the one hand, and four kneading zones 23 each consisting of two bilobes with no pitch 25. They have, at their downstream end, an outlet zone corresponding to the said outlet 20 and consisting of two bilobes with no pitch 25 separated by a space 26. The said outlet zone is followed downstream by a holding zone 15 consisting of a holding bilobe 17 with a negative pitch.

The two screws 4 are driven by a motor 10 different from a motor, not represented, which is provided to drive the gear pump 2. The latter connected upstream to the outlet 20 of the mixing and/or kneading device 1 via a vertical connector 21.

A vacuum aspiration aperture 11 is connected, at the downstream end of the screws 4, to the said holding zone 15, and more precisely to the downstream face of the holding bilobe 17.

The axles of the two toothed rollers of the pump 2 are situated in a horizontal plane.

The die 3 comprises a horizontal plate pierced with extrusion conduits oriented in a generally vertical direction.

The part of the equipment comprising the connector 21, the pump 2 and the die 3 is enclosed in a jacketed casing which is subdivided into three compartments vii–ix in which a cooling or heating fluid can be circulated.

Figure 6:
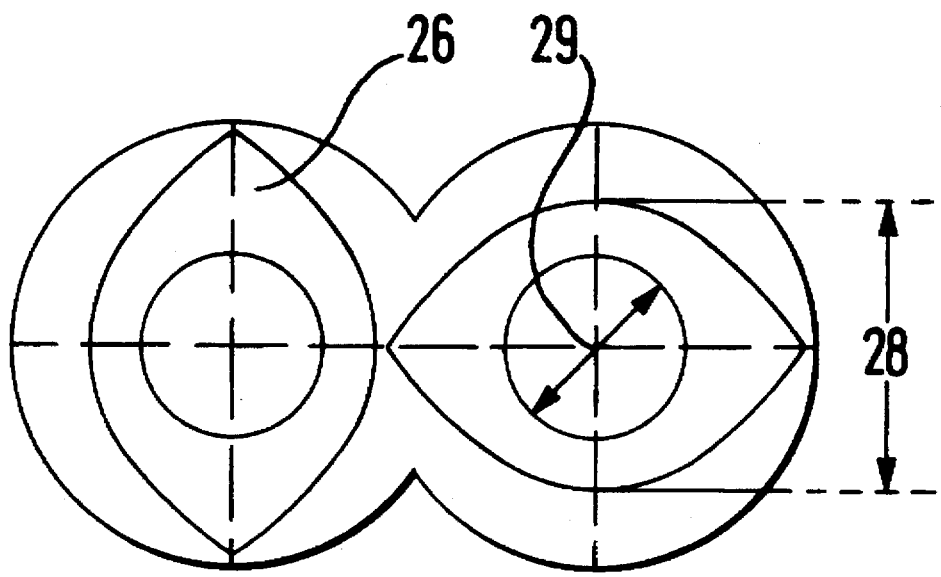
FIG. 6 is a cross-sectional view of the two screws of the equipment represented in FIG. 2.
Figure 7:
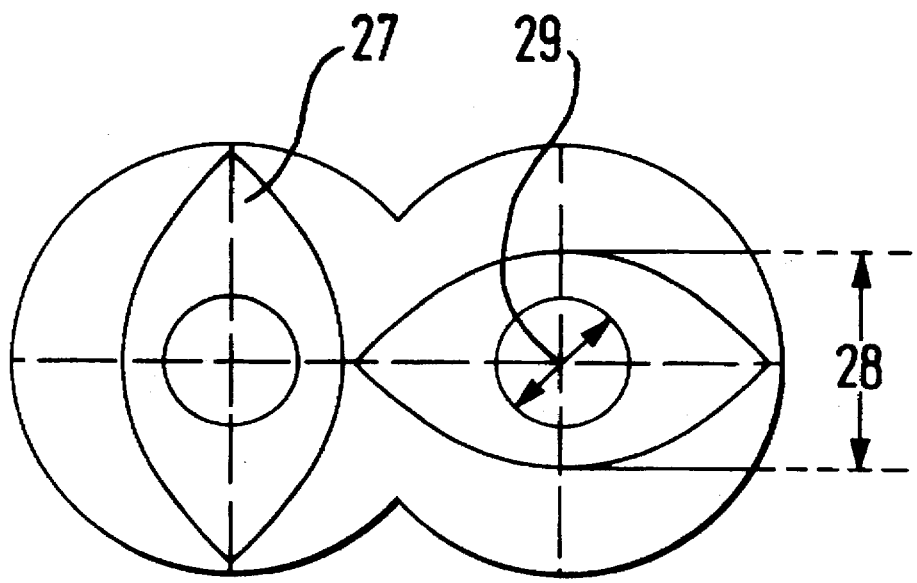
FIG. 7 is a cross-sectional view of the two screws of the equipment represented in FIG. 3.

FIGS. 6 and 7 show that, viewed in the direction of the screw axle, the shape of the bilobes 27 of a twin-screw mixer can be distinguished from the corresponding shape of the bilobes 26 of a twin-screw extruder by a smaller width 28, which leaves more free space for the material to be treated, namely for the said mixture of cereal flour or semolina and water. This smaller width of the bilobes 27 can be combined with a smaller diameter 29 of the axles as well as a smaller screw length/diameter ratio (c.f. FIGS. 4 and 5).

EXAMPLES

The process according to the present invention is described in greater detail in the examples presented below by way of illustration. The percentages are given therein by weight.

Example 1

Equipment corresponding to the first embodiment presented in FIG. 1 is used, in which the device with two screws meshing with each other and rotating in the same direction, in other words the twin-screw and its sleeve are those of a Continua C37 type WERNER & PFLEIDERER extruder, and the gear pump is an EXTREX 22/22 type MAAG PUMP SYSTEMS pump. Water and hard wheat semolina having a particle size range of between 250 and 350 μm are fed into this equipment.

39.9 kg/h of a mixture of semolina and water having a water content of 33% (30 kg/h of semolina +9.9 kg/h of water) is thus prepared and kneaded. The mixture is degassed, upstream of the pump, by aspiration using a vacuum of 0.2 bar. The residence time of the mixture in the twin-screw is about 60 s. The mixture is extruded through a die having cylindrical extrusion conduits of 1.85 mm in diameter.

For comparison, pasta is manufactured without a gear pump, while maintaining the power developed by the motor for driving the twin-screw ($W_{screw}$) equal to the sum of the powers developed for the present manufacture according to the invention by the same motor, on the one hand, and by the motor for driving the gear pump ($W_{pump}$), on the other hand. To do this, the flow rate of mixture through the equipment with no gear pump is reduced to 26.6 kg/h (20 kg/h of semolina +6.6 kg/h of water) by consequently adjusting the speed of rotation of the screws.

With each of these manufacturing processes, pasta, namely spaghetti, is obtained whose organoleptic qualities are comparable to those of spaghetti prepared in a traditional manner and having especially an attractive yellow colour without any white spots.

However, the precise adjustments of the speed of rotation of the screws and of the torque developed by the motor driving them, just like the temperature of the mixture and the pressure existing at different points of the equipment, vary significantly according to the manufacturing processes.

The following parameters were adjusted and/or determined during these manufacturing processes:

the pressure before the gear pump ($p_{pump}$)

the pressure before the die ($p_{die}$)

the speed of rotation of the screws ($n_{screw}$)

the speed of rotation of the toothed rollers of the pump ($n_{pump}$)

the temperature of the mixture at the outlet of the screws ($T_{mixture}$)

the temperature of the pasta at the outlet of the die ($T_{pasta}$)

the power developed by the motor for the screws ($W_{screw}$)

the power developed by the pump motor ($W_{pump}$)

the specific energy consumption per kg of pasta produced ($E_s$)

The values taken by these parameters during these manufacturing processes are assembled and presented in Table 1 below:

TABLE 1

|  | comparison | invention |
|---|---|---|
| $p_{pump}$ (bar) | — | 30 |
| $p_{die}$ (bar) | 55 | 50 |
| $n_{screw}$ (rpm) | 27 | 35 |
| $n_{pump}$ (rpm) | — | 123 |
| $T_{mixture}$ (°C.) | 40 | 40 |
| $T_{pasta}$ (°C.) | 40 | 50 |
| $W_{screw}$ (kW) | 6.46 | 6.08 |
| $W_{pump}$ (kW) | — | 0.45 |
| $E_s$ (kJ/kg) | 874 | 589 |

This table shows that the use of a gear pump according to the process and in the equipment according to the present invention makes it possible to substantially reduce the energy consumed to produce 1 kg of pasta, compared with a process and equipment which are otherwise similar but not comprising the use of a gear pump.

Examples 2–4

Equipment corresponding to the second embodiment presented in FIGS. 2, 4 and 6 is used, in which the device with two screws meshing with each other and rotating in the same direction, in other words the twin-screw and its sleeve are those of a C58 type WERNER & PFLEIDERER extruder and the gear pump is a VACOREX 45/45 type MAAG pump. Water and hard wheat semolina having a particle size range of between 250 and 300 μm are fed to this equipment.

A mixture of semolina and water having a water content of 31% is thus prepared and kneaded. The mixture is degassed upstream of the pump by aspiration using a vacuum of 0.2 bar. The residence time of the mixture in the twin-screw is about 45 s. The mixture is extruded through a die having extrusion orifices of circular section of 1.85 mm in diameter.

By circulating a cooling and/or heating fluid, a temperature of 25° C. is maintained in the first four compartments i–iv of the twin-screw sleeve, a temperature of 30° C. in the last compartment v of the sleeve, and a temperature of 45° C. in the compartment ix enclosing the die.

Under these conditions, three manufacturing processes are carried out during which the parameters defined in Example 1 and the quantities of semolina and water used take the values presented in Table 2 below:

TABLE 2

|  | Example 2 | Example 3 | Example 4 |
|---|---|---|---|
| semolina (kg/h) | 105 | 115 | 125 |
| water (kg/h) | 31.5 | 34.5 | 37.5 |
| $P_{pump}$ (bar) | 8–12 | 8 | 9 |
| $P_{die}$ (bar) | 100–104 | 104–106 | 96–100 |
| $n_{screw}$ (rpm) | 90 | 95 | 100 |
| $n_{pump}$ (rpm) | 39 | 44 | 46 |
| $T_{mixture}$ (°C.) | 39.4 | 39.6 | 41 |
| $T_{pasta}$ (°C.) | 46.6 | 48 | 50 |

With these manufacturing processes, pasta, namely spaghetti, is obtained which has an attractive yellow colour without any white spots and whose organoleptic qualities are comparable to those of spaghetti prepared in a traditional manner.

Examples 5 and 6

The procedure is carried out in the manner described in Examples 2–4, except for the fact that a premix (prepared with a rapid mixer) of water and soft wheat flour having a particle size range of 50–150 μm is fed to the equipment.

Under these conditions, two manufacturing processes are carried out during which the parameters defined in Example 1 and the quantities of flour and water used, just like the water content of the mixture, take the values presented in Table 3 below:

TABLE 3

|  | Example 5 | Example 6 |
|---|---|---|
| flour (kg/h) | 75 | 85 |
| water (kg/h) | 25.2 | 26 |
| water content (%) | 33 | 31 |
| $P_{pump}$ (bar) | 12 | 10 |
| $P_{die}$ (bar) | 85–90 | 85–90 |
| $n_{screw}$ (rpm) | 85 | 90 |
| $n_{pump}$ (rpm) | 29 | 33 |
| $T_{mixture}$ (°C.) | 39.7 | 40.8 |
| $T_{pasta}$ (°C.) | 48 | 52 |

With these manufacturing processes, pasta, namely spaghetti, is obtained which has an attractive cream colour without any white spots and whose organoleptic qualities are very similar to those of spaghetti prepared in a traditional manner.

Example 7

An apparatus corresponding to the third embodiment presented in FIGS. 3, 5 and 7 is used, in which the device with two screws meshing with each other and rotating in the same direction, in other words the twin-screw and its sleeve are those of a READCO-type TELEDYNE mixer of size 125 mm×1,100 mm and the gear pump is a VACOREX 90/90 type MAAG pump. Water and hard wheat semolina having a particle size range of between 250 and 300 μm are fed to this equipment.

A mixture of semolina and water having a water content of 30% is thus prepared and kneaded. The mixture is degassed upstream of the pump by aspiration using a vacuum of 0.2 bar. The residence time of the mixture in the twin-screw is about 45 s. The mixture is extruded through a die having extrusion orifices of circular section of 1.85 mm in diameter.

By circulating a heating fluid, a temperature of 48° C. is maintained in the three compartments i–iii of the twin-screw sleeve and in the compartment ix enclosing the die.

Under these conditions, a manufacturing process is carried out during which the parameters defined in Example 1 and the quantities of semolina and water used take the values presented in Table 4 below:

TABLE 4

|  | Example 7 |
|---|---|
| semolina (kg/h) | 800 |
| water (kg/h) | 200 |
| $P_{pump}$ (bar) | 8 |
| $P_{die}$ (bar) | 110 |
| $n_{screw}$ (rpm) | 70 |
| $n_{pump}$ (rpm) | 36 |
| $T_{mixture}$ (°C.) | 39 |
| $T_{pasta}$ (°C.) | 48 |

With this manufacturing process, pasta, namely spaghetti, is obtained which has an attractive yellow colour without any white spots and whose organoleptic qualities are comparable, or even superior to those of spaghetti prepared in a traditional manner.

Example 8

Pasta is prepared with hard wheat semolina in the manner described in Example 3, except for the fact that a die is used whose conduits have, on the one hand, a configuration causing incurvation of the extruded dough and, on the other hand, an s-shaped outlet orifice, such that the extruded dough rolls up around its axis in the form of a helix.

The pasta thus extruded has a wall thickness of 0.75 mm and an apparent diameter of 6 mm. They are cut into sections 4–5 cm in length with the aid of a rotating knife pressing against the die. Short pasta in the form of helices is obtained which has a yellow colour which is both intense and translucent, without any white spots, and whose organoleptic qualities are comparable or even superior to those of helices prepared in a traditional manner.

Indeed, for comparison, similar traditional pasta is prepared with the same die, but with an apparatus comprising a traditional mixer, kneader and press. Short pasta in the form of helices is obtained which has a more or less matte light yellow colour without any white spots.

Samples of this pasta are cooked for 4.5 min in salted boiling water. The results of visual assessment and tasting of this pasta by experienced tasters are presented in Table 5 below:

TABLE 5

|  | traditional helices, for comparison | helices according to the invention |
|---|---|---|
| colour of the uncooked pasta | more or less matte light yellow | more or less translucent more intense yellow |
| colour of the cooked pasta | bright light yellow | even brighter light yellow |
| texture of the cooded pasta | al dente | even firmer |

Example 9

Short pasta in the form of a helix is prepared in a manner similar to that described in Example 8, except for the fact that a soft wheat flour is used under the conditions described in Example 6, instead of a hard wheat semolina.

For comparison, similar pasta is prepared with the same die, but with equipment comprising a traditional mixer, kneader and press.

Samples of this short pasta in the form of helices are cooked for 4.5 min in salted boiling water. The results of visual assessment and tasting of this pasta by experienced tasters are presented in Table 6 below:

TABLE 6

|  | helices, for comparison | helices according to the invention |
|---|---|---|
| colour of the uncooked pasta | off-white more or less matte brown | off-white more or less translucent brown |
| colour of the cooked pasta | white | bright white |
| texture of the cooked pasta | not quite al dente | al dente |

What is claimed is:

1. A process for the manufacture of pasta, which comprises:
   preparing a mixture of water and flour wherein the water is present in the mixture in an amount of about 25 to 40% by weight;
   kneading the mixture by passing the mixture at a pressure of less than or equal to 30 bar between two screws which mesh with each other and which are rotating in the same direction at a speed of between about 20 to 120 RPM to form a kneaded dough;
   compressing the kneaded dough by passing it through a gear pump which includes toothed rotatable members which mesh with each other but which are designed to substantially avoid shearing of the dough and to form a compressed dough; and
   extruding the compressed dough in the shape of a pasta.

2. The process of claim 1 wherein the two screws are part of a twin-screw mixing or extruding device and the mixture is passed through the device with a residence time of between about 20 to 60 seconds.

3. The process of claim 1 which further comprises maintaining the temperature of the mixture and dough below about 55° C. during the kneading, compressing and extruding steps.

4. The process of claim 1 wherein the compressed dough is extruded through an extrusion die, with the gear pump exerting a pressure of between about 50 and 120 bar on the kneaded dough in order to compress and extrude it through the die.

5. The process of claim 1 wherein the flour is cereal flour or semolina and which further comprises premixing the cereal flour or semolina with the water to form the mixture.

6. The process of claim 5 which further comprises selecting the cereal flour to have a particle size range of 50–150 μm or selecting the cereal semolina to have a particle size range of 250–350 μm before forming the mixture.

7. The process of claim 2 which further comprises forming a plurality of processing zones in the twin-screw device by varying the length and direction of the pitch of the screws.

8. The process of claim 2 which further comprises enclosing the screws in a jacketed sleeve which is subdivided into compartments and circulating a fluid through the compartments for controlling the temperature of the mixture.

9. The process of claim 4 which further comprises enclosing the gear pump and extrusion die in a jacketed casing which is subdivided into compartments, and circulating a fluid through the compartments for controlling the temperature of the mixture.

10. The process of claim 9 which further comprises degassing the mixture upstream of the gear pump by subjecting the mixture to vacuum aspiration.

11. The process of claim 10 which further comprises conducting the vacuum aspiration at less than or equal to about 0.5 bar.

12. A process for the manufacture of pasta, which comprises:
   preparing a mixture of water and flour wherein the water is present in the mixture in an amount of about 25 to 40% by weight;
   kneading the mixture by passing the mixture at a pressure of less than or equal to 30 bar and a residence time of about 20 to 60 seconds through a twin-screw mixing or extruding device in which the two screws mesh with each other and rotate in the same direction at a speed of between about 20 to 120 RPM to form a kneaded dough;
   compressing the kneaded dough by passing it through a gear pump which includes toothed rotatable members which mesh with each other but which are designed to substantially avoid shearing of the dough and to form a compressed dough; and
   extruding the compressed dough in the shape of a pasta;
   wherein the kneading, compressing, and extruding steps are conducted while maintaining the temperature of the mixture and the dough below about 55° C.

13. A process for the manufacture of pasta, which comprises:
   preparing a mixture of water and cereal flour, wherein the water is present in the mixture in an amount of about 25 to 40% by weight;
   kneading the mixture by passing the mixture at a pressure of less than or equal to 30 bar and a residence time of about 20 to 60 seconds through a twin-screw mixing or extruding device in which two screws mesh with each other, said device having a plurality of processing zones in which the length and direction of the pitch of the screws are varied, and in which the screws rotate in the same direction at a speed of between about 20 to 120 RPM to form a kneaded dough;
   compressing the kneaded dough by passing it through a gear pump which includes toothed rotatable members which mesh with each other but which are designed to substantially avoid shearing of the dough and to form a compressed dough;
   degassing the mixture upstream of the gear pump;
   extruding the compressed and degassified dough through an extrusion die, with the gear pump exerting a pressure of between about 50 and 120 bar on the kneaded dough in order to compress and extrude it through the die in the shape of a pasta; and
   maintaining the temperature of the mixture and the dough below about 55° C. during the kneading, compressing, and extruding steps by enclosing the screws, gear pump and extrusion die in a jacketed sleeve to form a single device which is also subdivided into compartments, and by circulating a fluid through the compartments for maintaining the temperature of the mixture and dough below about 55° C.

* * * * *